May 28, 1946.　　　F. RIEBER　　　2,401,019
TIME INTERVAL METER
Filed Feb. 28, 1942　　　3 Sheets-Sheet 1

INVENTOR.
BY

May 28, 1946.  F. RIEBER  2,401,019
TIME INTERVAL METER
Filed Feb. 28, 1942  3 Sheets-Sheet 3
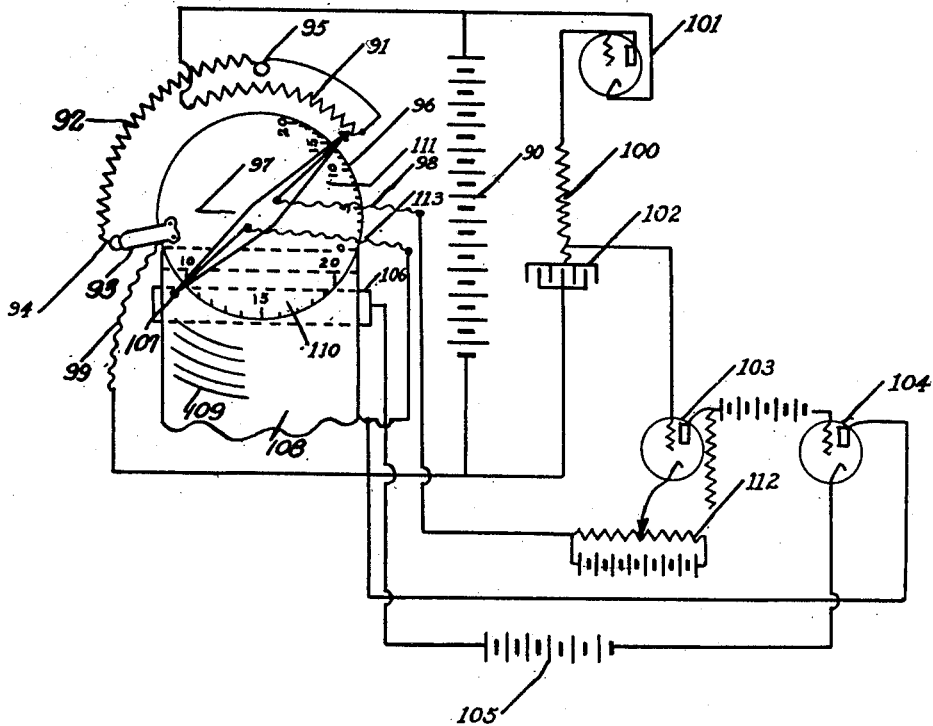
*Fig. 4.*
INVENTOR.
BY Patented May 28, 1946

2,401,019

UNITED STATES PATENT OFFICE 2,401,019

TIME INTERVAL METER

Frank Rieber, New York, N. Y., assignor to Interval Instruments, Inc., New York, N. Y., a corporation of New York Application February 28, 1942, Serial No. 432,893

11 Claims. (Cl. 234—36.5)

My invention relates to apparatus by which the time elapsing between two electrical signals may be accurately measured.

An object of my invention is to provide an apparatus for the measurement of time intervals, which will furnish a permanent visible record of such time intervals.

A further object of my invention is to provide an apparatus as aforesaid which may be used to measure, in rapid succession, a series of such elapsed time intervals, each interval being separately recorded as a permanent visual record.

A further object of my invention is to provide an apparatus as aforesaid which will be capable of accurately measuring extremely short intervals of elapsed time.

A further object of my invention is to provide an apparatus as aforesaid in which a high degree of accuracy, for example, of the order of 1 in 10,000 or 1 in 100,000 may be maintained even under extreme operating conditions.

A further object of my invention is to provide an apparatus as aforesaid in which the scale of elapsed time, as indicated on the record, may be made non-linear, for obtaining greater accuracy, in any desired position of said scale.

A further object of my invention is to provide an instrument as aforesaid, in which a variety of scales, of different ranges, may be included, together with simple provisions for changing the instrument from one scale to another.

Further objects of my invention will appear from the following disclosure in which I have illustrated one combination of elements by which my invention may be carried out, together with several variations which I may employ in the individual elements. I do not desire, however, to limit myself to the exact elements illustrated, it being understood that the scope of my invention is best defined by the claims appended to this specification.

Timing devices or interval meters have been constructed employing an electric circuit with a known time constant—such as a combination of an electrical condenser of known capacity and an electrical resistance of known value. If such a condenser is charged to a known potential, and thereafter discharged through a known resistance, the discharge being initiated by the first event, and terminated by the second event between which the time interval is to be measured, and if the potential remaining in the condenser after the discharge is then ascertained, this potential will serve as a measure of the elapsed time between the first and second events.

The instrument of my invention is somewhat similar to the electrical time constant instrument just described, but differs from it in a number of important respects. It is by virtue of these differences that I attain the advantages hereinabove referred to.

In previous instruments, it has been necessary to measure, to as high a degree of accuracy as possible, the actual potential at which the condenser is initially charged, either in volts, or some appropriate unit of potential. Thereafter, the potential remaining on the condenser after its discharge had been interrupted by the second event, was measured to an equally high degree of accuracy, again in volts, or some other appropriate unit. Knowing these two potentials each of which had been measured as accurately as possible, and knowing the resistance and capacity of the elements of the timing circuit, the elapsed time between the two events could be determined. However, the accuracy of such measurements was obviously limited by the accuracy of the potential measuring device or meter as well as by the operator's ability to read it, and the measurements were further inaccurate to the extent that the measuring system drew current from the timing condenser.

In my invention I have taken account of the fact that the ratio of the final potential of the condenser to the potential of the source of potential applied to the condenser, together with the resistance and capacity of the timing circuit, will serve to determine elapsed time. The exact value of either potential need not be measured at all, provided only this ratio is obtained with accuracy.

I am able to measure this ratio directly, comparing it with the setting of a potentiometer. I make this comparison by a null method, thereby securing the very high degree of accuracy possible with comparisons of this type, which may be made with as much as one hundred times the accuracy of a meter or other direct-indicating device. Furthermore the precise null point is indicated without previously drawing current from the timing condenser and is automatically and instantaneously indicated without the "hunting" process previously required with potentiometer devices.

To further comprehend my invention reference should be had to the accompanying drawings in which Fig. 1 illustrates my invention in general terms, the components shown in Fig. 1 being divisible into:

a. A timing system—1 to 6, inclusive.
b. A trigger system—6 to 13, inclusive.
c. An equating system—14 to 30, inclusive.
d. A recording system—31 to 44, inclusive.

Fig. 4 shows means whereby the visual scale of the meter and the electrical components may be interlocked, to permit rapid changes of operating range.

Figure 1:
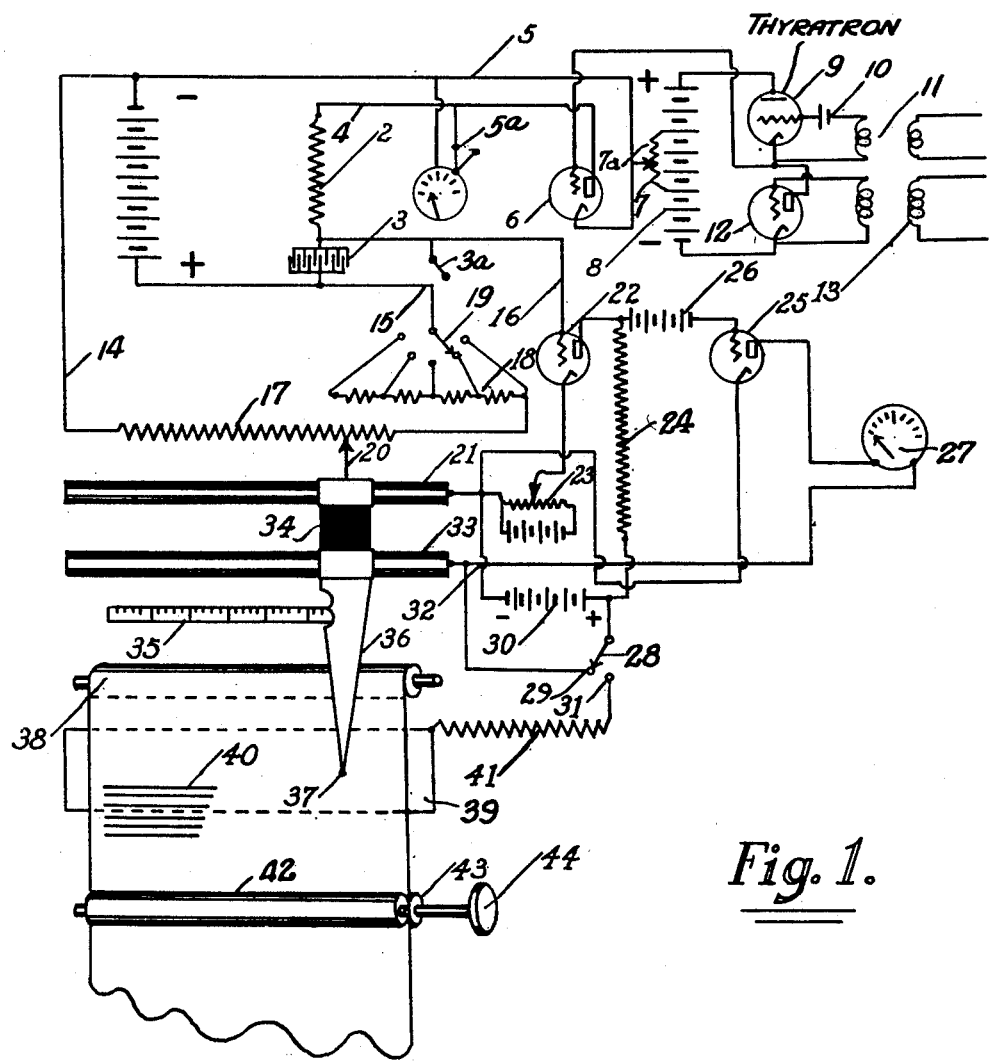

Referring to Fig. 1:

a. The timing system consists of a source of potential 1, a resistance 2 of known value, the effective resistance of the cathode-anode discharge path of tube 6, and a capacity 3, likewise of known value. This timing system communicates through terminals 4 and 5 with:

b. The trigger, control or keying system, including triode 6 which is adapted to complete the circuit between anode and cathode terminals 4 and 5, when actuated by a source of potential 8. The cathode of the triode 6 is connected to the slider 7a of potentiometer 7 which is connected across at least a portion of the source of potential 8. This potential may be discharged through the Thyratron 9, normally blocked by the potential source 10, but triggered into discharge condition by an impulse received through the transformer 11, opposite to and in excess of the potential applied to the grid of the Thyratron 9 by the potential source 10. In series with this Thyratron 9 is a triode 12, normally conductive, but capable of being momentarily blocked by an impulse reaching the grid of the triode 12 from the transformer 13. An anode-current meter 4a may be connected across terminals 4 and 5 by closing switch 5a for reasons later to be explained.

c. The equating system is connected to the timing and trigger or control systems just described through the conductors 14, 15 and 16. This equating system, as shown in Fig. 1, consists of a potentiometer in which a slide wire 17 is connected in series with a stepped resistance 18, contacted to a switch member 19.

This potentiometer system is connected across the source of potential 1 through the conductors 14 and 15. The conductor 16 leads to the grid of an equating tube 22, whose cathode is returned through the adjustable potential source 23 to the conductive bar 21 on which the contact 20 is slidably mounted to engage the potentiometer resistance 17. The tube 22 is coupled through a resistance 24 and a biasing potential 26 to the tube 25, whose anode circuit is energized by the potential source 30. An indicator 27 is also connected in series with the anode circuit of the tube 25. A switch member 28 is shown engaging the switch contact 29 to complete the anode circuit of the tube 25. The recording system is connected to the equating system through the terminals 31 and 32, the terminal 31 being a contact which may be engaged by the switch member 28, and terminal 32 being connected to the conductive bar 33, on which the contact finger 36 is slidably mounted, this contact finger being likewise mechanically connected to the sliding contact 20 by the insulating member 34. A scale 35 is provided for indicating the position of the contact finger 36. While my invention may be operated as a visual indicating system only, by the use of the members last above described, the scale position of the contact finger 36 being read from the scale 35, I may make a permanent record by passing current derived from the positive terminal of potential source 30, flowing thence through the switch contact 31, when the same is engaged by the switch member 28, and thence through the resistance 41 to the metal carrier plate 39, from which this current flows through suitable recording paper instantaneously sensitive to electric current (such as "Teledeltos paper"), supplied from the roll 38, ultimately reaching the contact point 37 on the contact finger 36 and returning therefrom through the bar 33 to the terminal 32 and thence to the anode of the tube 25, from the cathode of which tube the circuit is ultimately completed to the negative terminal of the potential source 30. The recording paper employed in the recording system as above referred to may be advanced in position by the two cooperating rollers 42 and 43, one on either side of the paper, actuated by the knob 44.

Having thus designated the elements in Fig. 1, I will now describe the functioning of these elements to make and record a time interval measurement. It is assumed that the time interval to be measured begins with an electrical signal or impulse which we will term the "first event" and ends with a second electrical signal or impulse which we will term the "second event."

Before the arrival of either event, the tube 12 is conductive, and the Thyratron 9 is non-conductive. Under these conditions, the potential source 8 applies a strong negative bias through the tube 12 to the grid of the tube 6 thereby blocking the latter tube completely. Under these conditions, no current can flow between the terminals 4 and 5, and accordingly, no charge will exist on the condenser 3. With no charge on the condenser 3 the potential of the grid relative to the cathode of tube 22 is adjusted by the variable potential source 23 until the anode current of the tube 25 reaches some suitable predetermined value, indicated by a scale point on the meter 27. This adjustment will in effect control the sensitivity of the balancing circuit by establishing or preselecting the position on resistor 17 at which the null point will occur.

The first event then reaches transformer 11, produces a pulse which overcomes the biasing potential 10, and causes the Thyratron 9 to become and remain conductive. The conductivity of this Thyratron being much greater than that of the tube 12, the grid of the tube 6 swings strongly positive, effectively connecting together the terminals 4 and 5, and permitting current from the potential source 1 to pass through the resistance 2 into the capacity 3. The potential of the capacity 3 gradually rises, in accordance with the time constant determined by this capacity 3 and the various impedances in the circuit supplying the potential.

The second event should occur before the charge on the capacity 3 reaches the full potential of the source 1. For accurate measurements, it is preferable to proportion the resistance 2 and the capacity 3, with respect to the time interval to be measured, so that the longest interval to be measured will not result in a potential on the capacity 3 which is much over one-half of the full potential of the source 1.

When the second event arrives at the transformer 13, it applies a negative impulse to the grid of the tube 12 thereby interrupting the flow of current through this tube 12 and through the Thyratron 9. Once interrupted, the Thyratron 9 becomes non-conductive again, with the result that the grid of the tube 6 swings strongly negative, thereby interrupting the circuit between terminals 4 and 5, and terminating the charging of the condenser 3.

At the termination of this charge, the condenser 3 will have reached a potential whose ratio to the total potential of the source 1, taken in conjunction with the time constant of the circuit 1, 6, 2, 3, will be an indication of elapsed time between the first event and the second event.

This potential on the condenser 3 will have impressed on the grid of the equating tube 22 a potential strongly negative with respect to its cathode, which in turn will have resulted in a deflection of meter 27 from its preadjusted registration to zero.

The potential of the grid of the tube 22, after the arrival of the first and second events, as has been just stated, is negative with respect to its cathode. It is now desired to bring the potential of this cathode to the same value, with relation to its grid, as that which existed before the charging of the condenser 3. It being assumed that the switch member 28 has been thrown into engagement with the terminal 29, this is done by sliding the contactor 20 from right to left along the slide resistance 17 until the pointer of the meter 27 reaches the same scale point which it occupied before the first event.

For simplicity's sake, it may be assumed that the switch member 19, under these conditions, is so set that none of the stepped resistance 18 is included in the circuit.

Meter 27 having originally been set, by adjustment of the potential source 23, so that the pointer of this meter registers the mentioned predetermined scale point when there is no charge on the condenser 3, return to this scale point indicates that the charge from the condenser 3 has been exactly counteracted in its action on the tube 22 by a potential derived from the potentiometer 17 as a result of current from source 1. This potential represents but a fraction of the total potential available from the source 1. Taken in conjunction with the known time constant of the circuit 1, 6, 2, 3, this fraction may be interpreted as elapsed time. If desired, the scale 35 may be calibrated in terms of this computed elapsed time, the time interval between the first and second events being then readable directly from this scale.

To make this reading, it is assumed that switch member 28 has been moved into engagement with terminal 29 and that the slider 34, carrying the sliding contactor 20 and the contact finger 36, will be moved to the left, manually or otherwise, as promptly after the second event as may be feasible, in order that the leakage resistance of the system will not alter the potential of the condenser 3 from the value reached when the second event interrupted the circuit through the tube 6. Although this visual measurement procedure cannot usually be carried out so rapidly as that next to be described, it does nevertheless have the advantage, common to both procedures, that the null point may be ascertained without influencing the charge on the timing condenser by virtue of which the present invention introduces great accuracy of measurement especially for very short time intervals. The charge on the timing condenser 3 is not affected during the period of measurement because tube 22 is always negatively biased beyond cut-off while the slider 20 is between the right extremity of potentiometer resistance 17 and the position of the null point on resistance 17, and thus no grid current flows in tube 22. However, should the slider be caused to pass to the left of the position of the null point, tube 22 will draw grid current and the charge on condenser 3 will be changed and a subsequent null point indication will not thereafter accurately represent the correct original ratio of potentials. For this reason the record measurement procedure now to be described is preferable.

If, in accordance with the preferred method, it is desired to operate the device as a recording instrument, the switch member 28 is engaged with the contact 31. Thereafter, upon the occurrence of the first and second events, the corresponding proportionate charge on the condenser 3 may be determined by moving the slider 34, manually or otherwise, from right to left, as described in connection with the visual measurement. It is assumed the circuit conditions have been previously adjusted so that the contact point 37 will just begin to cause a mark or line traced from right to left on the recording paper 38 at such time as the tube 25 has reached a point in its characteristic curve identical with that represented by the mentioned predetermined registration of meter 27 when the switch member 28 was in contact with the terminal 29.

Under these conditions, marks such as those shown at 40, will be begun upon the recording paper each time the slider 34, in the course of its travel to the left, reaches a point where the contact 20 assumes the same potential as that on the condenser 3, viz., the null point corresponds to the point where the mark begins. Thus the exact null point may automatically be ascertained without attention to the reading of meter 27 and with no possibility of its being "lost" through failure to observe the balance or registration point on a meter. As a practical matter, immediately upon the occurrence of the second event, the slider 34 may be swept from right to left with the assurance that the null point will be automatically indicated by the beginning of the mark 40 and the exact value at the null point may at any time thereafter be ascertained by reading the beginning or right-hand end of mark 40 against scale 35, or against a suitable projection of the scale, the length of the mark on the recording paper being of no significance.

A slight turn of the knob 44, made manually or otherwise, may be made after each successive interval measurement, thereby displacing the recording paper 38 slightly after each measurement, and causing the marks 40 to appear as a progressive succession of recorded measurements. Since, as above stated, condenser 3 should be discharged prior to each measurement, it is desirable to effect such discharge between successive measurements by short-circuiting the condenser in the manner well known in the art.

With none of the stepped resistance 18 included in the circuit, the scale 35 represents the entire elapsed time, which, as has previously been stated, must not exceed a certain maximum value if measurements are to be made accurately.

Under certain circumstances the approximate length of the time interval to be measured is previously known, and it is desired to measure small deviations from this generally known interval, to a high degree of accuracy. Under such conditions, an appropriate portion of the stepped resistance 18 is included in the circuit, together with a portion of the resistance 17, determined by the position of the sliding contact 20. An ideal condition would be to have the potential developed across the included portion of the stepped resistance 18, plus the potential developed across the resistance 17 when the slider 20 was at its midpoint, equal to the anticipated potential of the condenser 3 corresponding to the mean interval to be measured. Deviations from this midpoint setting of the slider 20 would then represent minor deviations from the mean anticipated time interval.

It will be readily seen that with a known time constant for the circuit 1, 6, 2, 3, a series of scales may be provided to be placed in the position 35, each such scale corresponding to one particular value of the stepped resistance 18 as determined by the switch member 17.

It is further obvious that a number of condensers, such as 3, may be provided, with different capacities—or that a number of resistors such as 2, with known values of resistance, may be provided with appropriate means for including or changing these circuit elements, and that a corresponding series of scales such as 35 may be provided to permit the instrument to be read directly in terms of the elapsed time determined by the dimensions of the elements included in the timing system. It will also be clear that a switch 3a may be provided, if desired, to discharge condenser 3.

Changes in element 2 or 3, or both, result in changes in the total scale of the time measuring system, while changes in the stepped resistance 18 result in the so-called "depressed zero" arrangement, by which a meter or other scale may be made to represent a portion only of the total quantity to be measured. The manner in which such changes may be introduced into the system will be further evident from the details shown in Figs. 2, 3, and 4.

Figure 2:
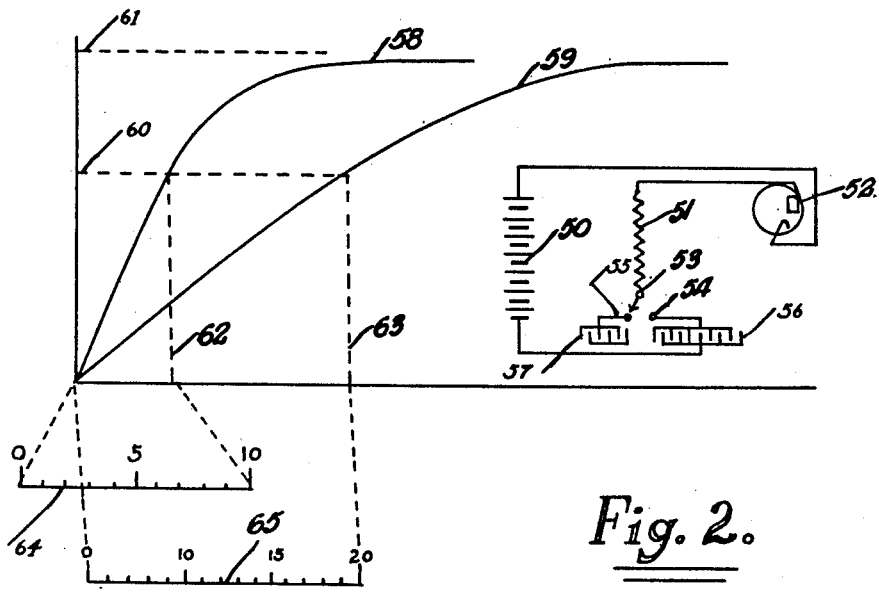
Fig. 2 shows how the timing system may be altered to provide any desired scale maximum

Referring to Fig. 2, the essential elements of a timing system are shown, in which 50 represents a source of potential, which may be connected through a keying tube 52, and a resistance 51, to either of the two condensers 56 and 57, in accordance with the setting of the switch member 53, which engages the contact 54 in order to include in the circuit the condenser 56, or alternatively, may engage the switch contact 55 in order to include in the circuit the condenser 57. The condenser 56 as shown has a much higher capacity than the condenser 57. A graphic representation of the charging curve of condenser 57 is represented by curve 58, while curve 59 represents the charging characteristic of the condenser 56. Referring to the graphs 58 and 59, point 60 represents the maximum straight-line charging potential to which either condenser may rise at the maximum elapsed time to be indicated on the meter scale, while point 61 represents the total charging potential from the source 50, to which value the potential of either condenser would ultimately rise, if connected for a sufficient time. Therefore it is preferable to so proportion the timing circuit that the maximum charge achieved by the condenser is not much over one-half the total available charging potential. Point 62 on the abscissa represents the total elapsed time at the point where the potential of the condenser 57 has reached the value 60. Point 63 on the abscissa represents the total elapsed time when the potential of the condenser 56 has reached the value 60. A possible scale 64, such as that shown earlier at 35 in Fig. 1, represents the total elapsed time, in some convenient units, corresponding to the charging of the condenser 57. The scale 65 shows similarly how the total elapsed time, expressed in the same units as shown in scale 64, will be increased by the substitution for the condenser 57 of the larger condenser 56.

Thus it will be seen that the total time scale of the meter of my invention may be altered by changing the capacity of the condenser included in the timing circuit.

It is obvious, however, that a similar alteration can be accomplished by changing the value of the resistance, as shown at 51 in Fig. 2.

Figure 3:
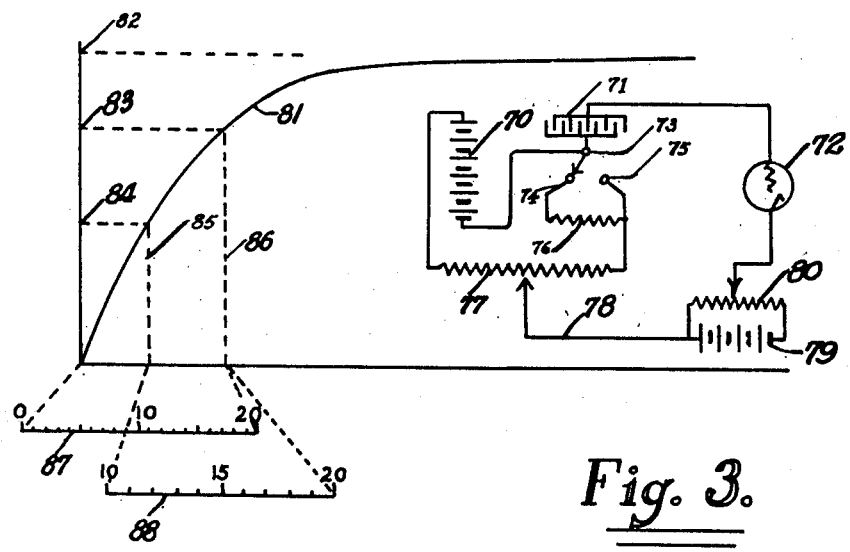
Fig. 3 shows how the equating system may be altered to cause the full scale of the meter to correspond to any desired portion of the total elapsed time.

Referring to Fig. 3, 70 represents a source of potential, from which a charge has been placed on the condenser 71 through the action of a timing circuit (not shown) similar to the circuit shown in Fig. 2. 72 represents an equating tube, similar to that shown at 22 in Fig. 1. 73 represents a switch member adapted to engage either the switch contact 74 or the switch contact 75. 76 represents a resistance, included in the circuit when the contact 74 is engaged, but excluded from the circuit when the contact 75 is engaged. 77 represents a potentiometer resistance (corresponding to resistance 17 of Fig. 1), engaged by the sliding contact 78, connected to the cathode of the tube 72 through a variable source of potential provided by the potential source 79 across which is connected the adjustable potentiometer 80. Curve 81 represents the charging characteristic of the condenser 71, point 82 representing the full potential of the source 70, while points 83 and 84 represent fractions of that potential, subtended by the sliding contact 78 under different conditions. If the switch member 73 engages the contact 74, thereby including the resistances 76 and 77, point 84 represents the minimum value, and point 83 the maximum value of the potential subtended by the sliding contact 78 at the extreme position of its stroke. If, however, the switch member 73 engages the switch contact 75, thereby excluding the resistance 76 from the circuit the potential subtended by the sliding contact 78, at one end of its stroke will be zero, while at the other end its potential will be represented by point 83, corresponding to the maximum time 86. Scale 87 is the time scale corresponding to engagement of the switch member 73 with the contact 75. It will be observed that this time scale starts at zero and reaches a total of twenty units. Scale 88 is the time scale corresponding to the engagement of the switch member 73 with the contact 74. It will be observed that, expressed in similar units to those shown on the scale 87, the scale 88 does not start at zero, but at a minimum figure of ten units, progressing to a total of twenty units, thus corresponding in utility to the "depressed zero" scale sometimes employed on meters where it is desired to read accurately small variations in the total electrical quantity to be measured.

It will be thus seen, in accordance with Fig. 3, that, for a given timing circuit, the equating circuit may be altered by the inclusion of a series resistance such as that shown at 76 in Fig. 3, in such fashion as to express the zero to any desired amount.

Referring to Fig. 4, 90 shows a source of potential similar to that indicated at 1 in Fig. 1, adapted to function through a keying tube 101, and a resistance 100, to charge a condenser 102, whose potential affects the equating tube 103 and thence the amplifying tube 104. Potentiometer resistance 91 is engaged by a sliding contact 96 mounted on a swinging arm pivoted at 97. Resistance 92 is adapted to be placed in series with the resistance 91 when the switch member 93 engages the switch contact 94, this resistance 92 being excluded from the circuit when the switch member 93 engages the switch contact 95. This switch member 93 is mounted on a rotating disc carrying the scales 110 and 111, so arranged that the scale 110 comes into reading position with respect to the recording paper 108 at the time switch member 93 engages the contact 94. When, by rotation of the scale disc, the switch member 93 has been brought into contact with the switch contact 95, the scale 111 rotates into reading position with respect to the recording paper 108. A marking contact 107 is attached to one extremity of the rotating arm and adapted to cooperate with the plate 106, beneath the recording paper 108, to produce marks such as 109, when the equating tube 103 is acted on equally by the potential on the condenser 102 and the potential subtended by the sliding contact 96, in which event, by previous adjustment of the tubes 103 and 104, accomplished by means of the variable potential source 112, the potential source 105 acting through the amplifying tube 104 causes current to flow through the recording paper 108, and between the marking contact 107 and the plate 106. The flexible conductor 99 is shown as a schematic representation of the manner in which the circuit to the switch member 93 is completed, while the flexible conductor 98 illustrates schematically the completion of the circuit to the sliding contact 96, and the flexible conductor 113 similarly carries current to the marking contact 107. In actual practice however, such circuits would be best completed by the use of some such device as the usual slip ring and brush arrangement.

To summarize, Fig. 4 shows the manner in which a switch member, adapted to change the resistance components of the equating circuit, may be interlocked with a scale-changing device.

In the construction of the timing circuit, as shown in Fig. 1, any values may be chosen for the capacity 3 and the resistance 2. I prefer, however, to choose for the resistance 2 a value considerably higher than that of the plate impedance of the tube 6 when the same is rendered conductive by the action of the Thyraton 9. The plate impedance of this tube 6 may vary slightly in use, and the reason for maintaining the resistance 2 at a far higher value than this plate impedance is to minimize any changes in the calibration of the meter caused by variations of the tube 6.

The plate impedance of the tube 6 will also vary slightly during the charging of the capacity 3, due to the reduction in the net applied electromotive force resulting from the big potential accumulated in the capacity 3. To minimize the results of this variation on the accuracy of the meter, it is desirable to employ a relatively high potential in the source 1.

If extreme precision is desired, a metering circuit may be installed by which the plate impedance of the tube 6 may be adjusted to and maintained at a definite pre-assigned value, prior to the operation of the device, by some such expedient as that of varying the position of the contact 7 with respect to the potentiometer 7a.

During such measurements, a plate current meter 4a may be conveniently bridged across the contacts 4 and 5 by closing the switch 5a.

While I have shown, as a timing circuit, a capacity cooperating with a resistance, it is obvious that a reactance may be substituted for the resistance if desired, or that otherwise a combination of resistance and reactance may be used, if for any reason it is desirable to employ in the meter a less linear relationship between charge and elapsed time than that given by the use of a resistance alone.

I have shown, in the foregoing disclosure, means for sweeping the moving element of a potentiometer through its range, and means for indicating the position in the said sweep at which the potential of the movable contact becomes equal to the potential of the capacity element in a time constant circuit.

Where the elapsed time to be measured is directly related to some other quantity, such as distance, the scale indicating the position of the movable potentiometer element may be directly calibrated in distance rather than time. Such a construction, for example, is useful where the meter of my invention is to be employed to determine the distance through which a wave impulse of known velocity has travelled during the time interval between the first and second events. For example, the depth of water below a ship may be indicated by the time elapsing between the transmission of a sound wave into the water from the ship, and the return to the ship of the reflection of this wave from the bottom, the velocity of such waves in water being known.

Having thus described my invention, I claim:

1. In a metering system for measuring elapsed time between two events, a source of electric potential, an electric timing circuit having a predetermined time constant and containing a capacity element and an impedance connected in series, first control means actuated by an impulse corresponding to the first event and adapted to effectively close a connection between said timing circuit and said source of potential, second control means actuated by an impulse corresponding to the second event and adapted to effectively interrupt said connection between said timing circuit and said source, balancing means connected to said timing circuit operative after the second event has occurred for determining the ratio between the electrical potentials of the potential source and the capacity element of said timing circuit, and a thermionic tube, the point of connection between said capacity and said impedance being connected to the grid of said tube and otherwise insulated from said circuit said tube serving as a connection between said capacity element and said balancing means and including means actuated by the potential of said capacity element to maintain the charge on said capacity element substantially constant between the time of said second event and the time of determining said ratio, whereby to provide greatly increased accuracy of measurement of short time intervals.

2. In a metering system for measuring elapsed time between two events, the combination of a source of direct-current potential, a timing circuit including two timing elements one of which is a capacity, a control circuit including means serving to link said source and said timing circuit to charge said capacity in accordance with the elapsed time, a tube circuit including a thermionic tube having an anode, a cathode and a grid, and a source of adjustable biasing potential, and a potentiometer circuit including a potentiometer comprising a resistor and a contactor movable thereon, said resistor being effectively connected across said direct-current source, measurement-indicating means cooperating with said contactor, said source of biasing potential being connected between said contactor and the cathode of said tube, a connection from the negative side of said capacity to the grid of said tube, and balance-indicating means actuated in response to the anode current of said tube.

3. In a metering system for measuring elapsed time between two events, the combination of a source of direct-current potential, a timing circuit including two timing elements one of which is a capacity, a control circuit including means serving to link said source and said timing circuit to charge said capacity in accordance with the elapsed time, a tube circuit including a thermionic tube having an anode, a cathode and a grid, and a source of biasing potential shunted by a second potentiometer the adjustable contact of which is connected to the cathode of said tube, and a potentiometer circuit including a potentiometer comprising a resistor and a contactor movable thereon, said resistor being effectively connected across said direct-current source, measurement-indicating means cooperating with said contactor, a connection between said contactor and one terminal of said potentiometer, a connection from the negative side of said capacity to the grid of said tube, and balance-indicating means actuated in response to the anode current of said tube.

4. A metering system for measuring elapsed time between two events, including in combination, a source of direct-current potential, a timing circuit including series-connected resistance and capacity connectible effectively across said source, a control system thermionically linked to said timing circuit and including first thermionic means actuated in response to the first event to effectively connect said timing circuit to said source and second thermionic means actuated in response to the second event to effectively disconnect said timing circuit from said source, a tube circuit including a thermionic tube having an anode, a cathode and a grid, and a source of adjustable biasing potential, a potentiometer circuit including a potentiometer comprising a resistor and a contactor movable thereon, said resistor being effectively connected across said direct-current source, said source of biasing potential being connected between said contactor and the cathode of said tube, measurement-indicating means cooperating with said contactor, and balance-indicating means coupled to the anode of said tube and actuated in response to the anode current thereof.

5. In a metering system for measuring with extreme accuracy elapsed time between two events, the combination which includes, a source of electric charging potential, a timing circuit including an impedance and a condenser connected in series whereby said condenser is chargeable by said source through said impedance, means selectively, successively and instantaneously responsive to distinct electric impulses corresponding to said two events for respectively starting and stopping the charging of said condenser in accordance with the elapsed time, an electron tube, the connection between said condenser and said impedance being connected to the grid of said tube and being otherwise insulated from the circuit, a potentiometer connected effectively across said source, a balancing system including said potentiometer connected to alter the voltage of the cathode of said tube to balance the potential of said condenser against the adjusted potential of said potentiometer, and recording means connecting the plate circuit to said tube and said potentiometer for automatically and instantaneously recording the potentiometer adjustment at which said balance obtains, the arrangement being such that the charge on said condenser remains substantially constant at least until said balance obtains.

6. In a metering system for measuring with extreme accuracy elapsed time between two events, the combination which includes, a source of electric charging potential, a timing circuit including an impedance and a condenser connected in series whereby said condenser is chargeable by said source through said impedance, means selectively, successively and instantaneously responsive to electric impulses corresponding to said two events for respectively starting and stopping the charging of said condenser in accordance with the elapsed time, an electron tube, the connection between said condenser and said impedance being connected to the grid of said tube and being otherwise insulated from the circuit, a potentiometer connected effectively across said source, a balancing system connected to alter the voltage of the cathode of said tube to balance the potential of said condenser against the adjusted potential of said potentiometer, and recording means connected to the plate circuit of said tube and energized by a source separate from said charging potential for automatically and instantaneously recording the potentiometer adjustment at which said balance obtains.

7. In a metering system for measuring with extreme accuracy elapsed time between two events, the combination which includes, a source of electric charging potential, a timing circuit including an impedance and a condenser connected in series whereby said condenser is chargeable by said source through said impedance, means selectively, successively and instantaneously responsive to electric impulses corresponding to said two events for respectively starting and stopping the charging of said condenser in accordance with the elapsed time, an electron tube, the connection between said condenser and said impedance being connected to the grid of said tube and being otherwise insulated from the circuit, a potentiometer connected effectively across said source, a balancing system connected to alter the voltage of the cathode of said tube to balance the potential of said condenser against the adjusted potential of said potentiometer, the arrangement being such that the charge on said condenser remains substantially constant at least until said balance obtains, and recording means connected to the plate circuit of said tube and energized by a source separate from said charging potential for automatically and instantaneously recording the potentiometer adjustment at which said balance obtains.

8. In a metering system for measuring elapsed time between two events, the combination which includes, a source of electric charging potential, a timing circuit including an impedance and a condenser chargeable by said source through said impedance, means selectively, successively and instantaneously responsive to said two events for respectively starting and stopping the charging of said condenser in accordance with the elapsed time, a potentiometer connected effectively across said source, a balancing system connected to balance the potential of said condenser against the adjusted potential of said potentiometer, means for indicating the condition of balance in said balancing system, a thermionic tube connected in said balancing system, said tube having a grid connected to the juncture of said condenser and said impedance and a cathode connected to the adjustable contactor of said potentiometer whereby the position of the balance point on said potentiometer may be preselected.

9. In combination with a metering system for measuring elapsed time between two events, which includes a source of direct-current charging potential, a timing circuit including a condenser and a resistor connected in series with the anode and cathode of a first thermionic tube, and a control system including the cathode of said tube, a control electrode thereof, a starting circuit including a thermionic gas-filled tube having anode, cathode and a control electrode, a stopping circuit including a thermionic vacuum tube having anode, cathode and a control electrode, an interconnection between the anode of said vacuum tube and the cathode of said gas-filled tube, a connection from said interconnection to the control electrode of said first thermionic tube, a source of anode potential connected with its positive terminal to the anode of said gas-filled tube and its negative terminal to the cathode of said vacuum tube, a connection from an intermediate tap on said source of anode potential to the cathode of said first thermionic tube, and first and second input elements, one each being connected between the cathode and control electrode of each of said last-mentioned tubes, and means for impressing a first timing impulse and a second timing impulse on said first and second input elements, respectively.

10. In a metering system for measuring with extreme accuracy elapsed time between two events, the combination which includes, a source of direct-current charging potential, a timing circuit including series-connected resistance and capacity connectible effectively across said source, one terminal of said capacity being connected to the positive terminal of said source, a control system selectively, successively and instantaneously responsive to said two events for effectively connecting said capacity to and disconnecting said capacity from said source, a potentiometer the terminals of which are connected effectively one to the negative terminal of said source and the other to said positive terminal of said source and to said terminal of said capacity, an adjustable contactor on said potentiometer, a cut-off and balancing system including a first thermionic tube having an anode, a cathode and a grid, a source of adjustable biasing potential connected between said contactor and said cathode, a connection from the negative side of said capacity to the grid of said first tube, a thermionic amplifier tube the input of which is coupled to the anode circuit of said first tube, a source of anode current for said amplifier tube, and means operable by said anode current only subsequent to said second event for instantaneously and automatically recording the point of adjustment of said potentiometer at which the potential of said capacity balances the bias on the grid of said first tube.

11. In a metering system for measuring with extreme accuracy elapsed time between two events, the combination which includes, a source of direct-current charging potential, a timing circuit including series-connected resistance and capacity connectible effectively across said source, a control system selectively, successively and instantaneously responsive to said two events for effectively connecting said capacity to and disconnecting said capacity from said source, a potentiometer resistance one terminal of which is connected to the negative terminal of said source and the other terminal of which is connected in series through a resistor adjustable in steps to the positive terminal of said source and to the first terminal of said capacity, a balancing system including a first thermionic tube having an anode, a cathode and a grid, a connection from said grid to the second terminal of said capacity which is effectively connected to the negative terminal of said source, an adjustable contactor on said potentiometer resistor, a source of adjustable biasing potential connected between said contactor and said cathode, a thermionic amplifier tube coupled to the anode circuit of said first tube, a source of anode current for said amplifier tube, an electric contact insulated from and uncontrollable with said potentiometer contactor, an electrically conductive carrier comprising a support for an electro-sensitive recording strip, said contact being adapted to make electrical connection with said strip, and means connecting said contact and said carrier in the anode circuit of said amplifier tube.

FRANK RIEBER.